Patented Jan. 5, 1926.

1,568,667

UNITED STATES PATENT OFFICE.

GURNEY O. GUTEKUNST, OF ROCHESTER, NEW YORK, ASSIGNOR TO EASTMAN KODAK COMPANY, OF ROCHESTER, NEW YORK, A CORPORATION OF NEW YORK.

CARBOCYANINE DYES AND PROCESS OF MAKING SAME.

No Drawing.     Application filed September 29, 1921.   Serial No. 504,207.

*To all whom it may concern:*

Be it known that I, GURNEY O. GUTE-KUNST, a citizen of the United States of America, residing at Rochester, in the county of Monroe and State of New York, have invented certain new and useful Improvements in Carbocyanine Dyes and Processes of Making Same, of which the following is a full, clear, and exact specification.

This invention relates to carbocyanine dyes effective for red and infra-red sensitization of photographic emulsions.

I have discovered that dyes of this type may be obtained by the action of a strong base upon a beta-naphtho-quinaldine alkyl-halide in the presence of a suitable condensing agent. More specifically the above named intermediate is condensed upon itself, either alone or in the presence of certain other compounds such as a quinoline alkyl-halide or a phenanthroline alkyl-halide, when in solution with a strong base or alkali, such as alcoholic potash, sodium methylate or sodium ethylate, or an aqueous solution of sodium or potassium hydroxide, and also of a suitable condensing agent such as a trihalogen methane or formaldehyde.

When a trihalogen methane is used the intermediate alone is used; but when formaldehyde is the condensing agent the presence of one of the additional compounds is particularly useful, though it apparently does not enter into the finished dye. The use of a trihalogen methane and particularly iodoform is preferred as the yield is very much greater and the reaction much more certain.

The following example will serve to illustrate the preferred procedure: A solution of 5 grams of beta-naphtho-quinaldine ethiodide in 500 cc. of boiling 95% ethyl alcohol is treated with a mixture of 15 cc. alcoholic potash and 4 grams of iodoform dissolved in 50 cc. of 95% ethyl alcohol. A blue solution forms at once and small green needle crystals immediately separate. These are recrystallized from methyl or ethyl alcohol. It is solid at ordinary temperatures.

This dye of the carbocyanine series is particularly useful for sensitizing photographic emulsions for red and infra-red. The maximum sensitivity is at about 700μμ, but its sensitizing effect extends to a useful degree beyond 740μμ.

Having thus described my invention, what I claim as new and desire to secure by Letters Patent is:

1. A dye of the carbocyanine type produced by the condensation on itself of a naphtho-quinaldine alkylhalide.

2. A dye of the carbocyanine type produced by the condensation on itself of a beta-naphtho-quinaldine alkylhalide in solution with a strong base and a condensing agent.

3. A dye produced by the condensation on itself of beta-naphtho-quinaldine ethiodide in alcoholic solution with an alkali and iodoform.

4. The process of producing a dye of the carbocyanine type that comprises condensing beta-naphtho-quinaldine ethiodide on itself in the presence of an alkali and of a trihalogen methane.

5. The process of producing a dye effective for infra-red photographic sensitization that comprises treating beta-naphtho-quinaldine ethiodide with alcoholic potash in the presence of iodoform.

Signed at Rochester, New York, this 24th day of September, 1921.

GURNEY O. GUTEKUNST.